(12) United States Patent
Klode et al.

(10) Patent No.: US 12,269,584 B2
(45) Date of Patent: Apr. 8, 2025

(54) LANDING GEAR ACTUATION SYSTEM

(71) Applicant: GOODRICH CORPORATION, Charlotte, NC (US)

(72) Inventors: Harald Klode, Centerville, OH (US); Kyle M. Madey, Broadview Hts, OH (US); Gerard Cox, Burlington (CA)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/714,857

(22) Filed: Apr. 6, 2022

(65) Prior Publication Data

US 2023/0322370 A1    Oct. 12, 2023

(51) Int. Cl.
| B64C 25/12 | (2006.01) |
| B64C 25/26 | (2006.01) |
| B64C 25/62 | (2006.01) |
| F16F 1/02  | (2006.01) |
| B64C 25/22 | (2006.01) |

(52) U.S. Cl.
CPC .............. *B64C 25/12* (2013.01); *B64C 25/26* (2013.01); *B64C 25/62* (2013.01); *F16F 1/027* (2013.01); *B64C 25/22* (2013.01)

(58) Field of Classification Search
CPC ......... B64C 25/12; B64C 25/22; B64C 25/26; B64C 25/62; F16F 1/027
See application file for complete search history.

(56) References Cited

U.S. PATENT DOCUMENTS

| 2,506,178 | A  |   | 5/1950  | Shaw     |             |
|-----------|----|---|---------|----------|-------------|
| 8,070,094 | B2 | * | 12/2011 | Collins  | B64C 25/12  |
|           |    |   |         |          | 244/102 SL  |
| 10,196,132| B2 |   | 2/2019  | Schmidt  |             |
| 2001/0011692 | A1 | * | 8/2001 | Sprenger | B64D 11/003 |
|           |    |   |         |          | 244/118.5   |
| 2019/0185145 | A1 |   | 6/2019 | Price    |             |
| 2020/0346743 | A1 | * | 11/2020| Bernard  | B64C 29/0091|

FOREIGN PATENT DOCUMENTS

| CN | 205971817 |    | 2/2017 |           |
| CN | 112793766 |    | 5/2021 |           |
| DE | 102009046117 | A1 * | 5/2011 | B64C 25/12 |
| DE | 112011103611 | T5 * | 9/2013 | B65D 21/086|
| GB | 396609    | A * | 8/1932 | B64C 25/12 |
| GB | 396956    |    | 8/1933 |           |
| GB | 489385    |    | 7/1938 |           |

(Continued)

OTHER PUBLICATIONS

Machine Translation of DE-112011103611-T5, Meijers A V M, Sep. 2013 (Year: 2013).*

(Continued)

*Primary Examiner* — Tien Q Dinh
*Assistant Examiner* — Katherine June Walter
(74) *Attorney, Agent, or Firm* — SNELL & WILMER L.L.P.

(57) ABSTRACT

The landing gear actuation system includes an attachment point integral to a movable member, a flexible pull member having a first end coupled to the attachment point, and a motor configured to move the flexible pull member, wherein the movement of the flexible pull member moves the attachment point and the movable member.

7 Claims, 9 Drawing Sheets

(56) References Cited

FOREIGN PATENT DOCUMENTS

| GB | 595529 | | 12/1947 | | |
|---|---|---|---|---|---|
| GB | 2470499 | A * | 11/2010 | ............. | B64C 25/10 |
| WO | WO-2019067873 | A1 * | 4/2019 | ........... | B64C 25/001 |
| WO | 20190137078 | | 7/2019 | | |

OTHER PUBLICATIONS

Machine Translation of DE-102009046117-A1, Fischer T, May 2011 (Year: 2011).*
Hogan, "Rapid-prototyping and hardware-in-the-loop laboratory platform for development and testing of electro-mechanical actuator controls", IET Journals, The Journal of Engineering, 2019 (Year: 2019).*
European Patent Office, European Search Report dated Aug. 14, 2023 in Application No. 231634759.

* cited by examiner

LANDING GEAR ACTUATION SYSTEM

FIELD

The present disclosure generally relates to the field of aircraft landing gear and, more particularly, to the actuation of aircraft landing gear.

BACKGROUND

Landing gear actuation systems generally utilize hydraulic components that work with a central or a localized hydraulic system. As aircraft become more advanced there is a need for an electric landing gear actuation system that does not use a hydraulic system.

SUMMARY

A landing gear actuation system is disclosed herein. The landing gear actuation system includes an attachment point integral to a movable member, a flexible pull member having a first end coupled to the attachment point, and a motor configured to move the flexible pull member, wherein the movement of the flexible pull member moves the attachment point and the movable member.

In various embodiments, the landing gear actuation system further includes a spring configured to maintain tension in the flexible pull member, wherein the flexible pull member has a second end opposing the first end, the second end coupled to the spring.

In various embodiments, the motor is an electro-mechanical motor.

In various embodiments, the flexible pull member further includes a first side orthogonal to the first end, the first side having a plurality of ridges, wherein the motor is configured to engage the plurality of ridges to move the flexible pull member.

In various embodiments, the motor is configured to rotate as the moveable member moves.

In various embodiments, the landing gear actuation system further includes a storage location configured to receive a second end of flexible pull member, the second end opposing the first end.

In various embodiments, the landing gear actuation system further includes a damper configured to maintain tension in the flexible pull member.

Also disclosed herein is a landing gear actuation system. The landing gear actuation system includes an attachment point coupled to a movable member, a flexible pull member having a first end and an opposing second end, the flexible pull member coupled to the attachment point between the first end and the second end, a first motor configured to move the flexible pull member, and a second motor configured to maintain tension in the flexible pull member.

In various embodiments, the landing gear actuation system further includes a spring coupled to the first end of the flexible pull member. In various embodiments, the spring is a gas spring.

In various embodiments, the landing gear actuation system further includes a second spring coupled to the second end of the flexible pull member. In various embodiments, the second spring is a gas spring.

In various embodiments, the second motor is further configured to move the flexible pull member cooperatively with the first motor.

In various embodiments, the landing gear actuation system further includes a first damper coupled to the first end of the flexible pull member and a second damper coupled to the second end of the flexible pull member.

In various embodiments, the flexible pull member further includes a first portion having a first end and an opposing second end, the first end of the first portion coupled to the first damper and the second end of the first portion coupled to the attachment point and a second portion having a first end and an opposing second end, the first end of the second portion coupled to the second damper and the second end of the second portion coupled to the attachment point.

In various embodiments, the first damper is a pneumatic damper.

In various embodiments, the second damper is a hydraulic damper.

Also disclosed herein is a landing gear for an aircraft. The landing gear includes a landing gear assembly having a main strut, a wheel assembly coupled to the main strut of the landing gear assembly, and an actuation system configured to extend and retract the landing gear. The actuation system includes an attachment point integral to the main strut, a motor configured to move the landing gear assembly, and a flexible pull member having a first end and an opposing second end, the first end coupled to the attachment point, and the second end coupled the motor.

In various embodiments, landing gear further includes a first damper coupled to the first end of the flexible pull member.

In various embodiments, the landing gear further includes a second motor configured to move the flexible pull member cooperatively with the motor, the second motor coupled to the second end of the flexible pull member, the attachment point coupled to the flexible pull member between the first end and the second end of the flexible pull member.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
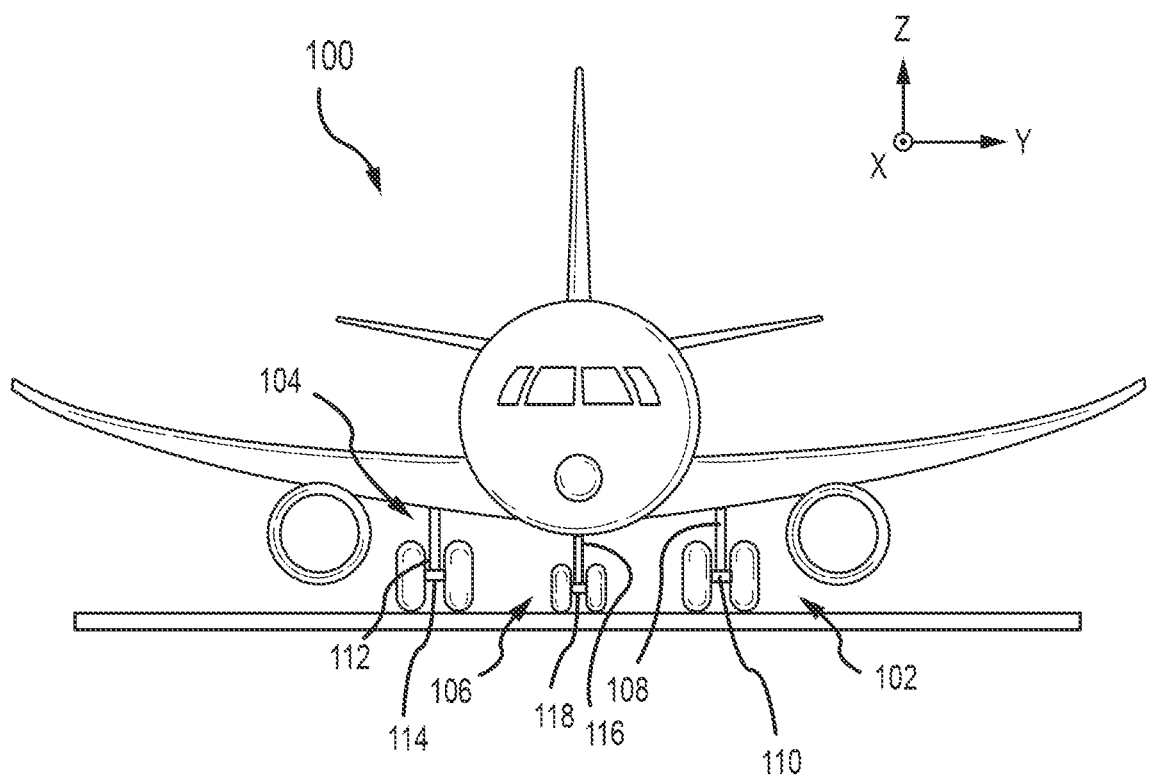
FIG. 1 illustrates an aircraft having a landing gear assembly and wheels mounted thereon, according with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a mechanism of extending and retracting an aircraft landing gear. The mechanism, in various embodiments, provides packaging flexibility and allows for the use of an electric actuator instead of a linear ball or roller screw mechanism. This eliminates failure modes associated with ball or roller screws that would prevent emergency deployment of landing gear.

According to various embodiments, landing gear retraction is accomplished via a first flexible pull member (belt, cable, chain, rod, etc.) that is attached to the landing gear strut, and engaged via a drive sheath that is actuated by an electric gear motor. A first end of the first flexible pull member is affixed to the landing gear strut and the first flexible pull member extends in a first direction away from the landing gear strut to an anchor point at a second end of the first flexible member. In various embodiments, a second flexible pull member is attached to the landing gear strut and extends in a second direction that is opposite the first direction. The second flexible pull member may be configured to maintain tension on the first flexible pull member under various operating conditions including negative g-forces, banking, and bounce, among others. This relatively constant tension may be accomplished using a second gear motor, or a passive or active damper system (e.g., magnetorheological device, linear spring damper, etc.). The first and second pull members, in various embodiments, could also be joined to form a continuous loop with a tension adjuster to account for various kinematic landing gear states, such as for example, slack control. Advantages of the disclosed mechanism for extending and retracting aircraft landing gear include working without a centralized hydraulic system, removing hydraulic fluid from the system, eliminating failure modes, and packaging flexibility. Aircraft without a centralized hydraulic system will benefit from improved space savings and performance disclosed herein. Furthermore, removing hydraulic fluid from the landing gear retraction system results in elimination of fluid leaks. Failure modes of current systems, such as those associated with ball and/or roller screws that prevent landing gear emergency deployment are eliminated. Additionally, packaging flexibility may be accomplished through different storage configurations of flexible pull members as compared to the fixed storage used by the hydraulic actuator of current systems.

Referring to FIG. 1, illustrated is a representative aircraft 100, according to various embodiments of the present disclosure. The aircraft 100 may include one or more landing gear, such as, for example, a left landing gear 102 (or port-side landing gear), a right landing gear 104 f (or starboard-side landing gear) and a nose landing gear 106. Each of the left landing gear 102, the right landing gear 104 and the nose landing gear 106 may support the aircraft 100 when not flying, allowing the aircraft 100 to taxi, takeoff, and land, safely and without damage to the aircraft. The left landing gear 102 may include a left landing gear assembly 108 that includes a left wheel assembly 110, the right landing gear 104 may include a right landing gear assembly 112 that includes a right wheel assembly 114 and the nose landing gear 106 may include a nose landing gear assembly 116 that includes a nose wheel assembly 118.

Figure 2A:
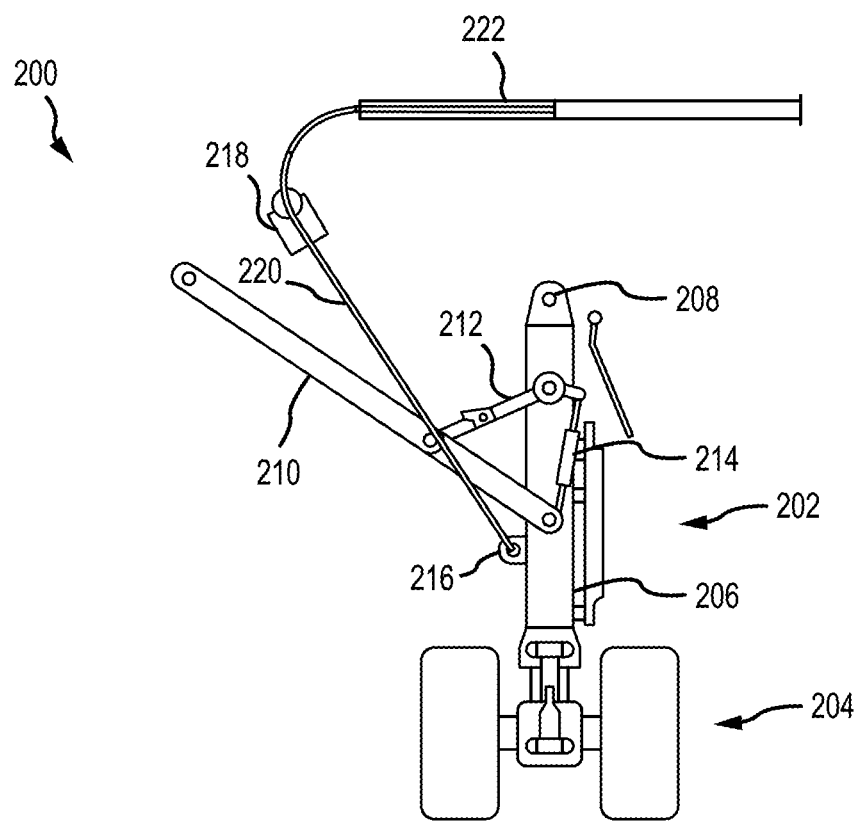
FIGS. 2A, 2B, 2C and 2D illustrate an exemplary landing gear actuation system using a flexible transmission member, according to various embodiments.

Referring now to FIGS. 2A-2D, illustrated is an exemplary landing gear 200 in multiple positions during an extending or retracting procedure, according to various embodiments of the present disclosure. Landing gear 200 may be an example of left landing gear 102, right landing gear 104, or nose landing gear 106. Landing gear 200 includes a landing gear assembly 202 and a wheel assembly 204. Landing gear assembly 202 includes a main strut 206, a trunnion 208, a side stay 210, a locking link 212, and a dampener 214. As illustrated in FIGS. 2A-2D, landing gear assembly 202 rotates about trunnion 208 during extending and retracting procedures. In the fully extended position, as shown in FIG. 2A, side stay 210 is fully extended and provides support for main strut 206 to stay extended. Locking link 212 extends between main strut 206 and side stay 210 to provide locking support to side stay 210 to keep side stay 210 extended and supporting main strut 206. Dampener 214, alternatively referred to as a lock actuator, provides further support to maintain side stay 210 in the extended position.

In various embodiments, an actuation system of landing gear 200 includes an attachment point 216, a motor 218, and a flexible pull member 220 extending from attachment point 216 at a first end of flexible pull member 220 and around motor 218 to a connection point at a second end of flexible pull member 220. Attachment point 216 is coupled to main strut 206 between side stay 210 and wheel assembly 204. Placement of attachment point 216 is determined by various parameters such as, for example, extension and retraction torque at attachment point 216, storage arrangement of flexible pull member 220, parameters for forces when on the ground, total travel of landing gear assembly 202 during retraction and extension, just to name a few. In various embodiments, attachment point 216 is placed as low on main strut 206 (i.e., proximate wheel assembly 204). In various embodiments, attachment point 216 includes a spindle pin to allow rotation of the first end of flexible pull member 220 about attachment point 216 as the angle of pull moves through the extending and retracting process.

Motor 218 provides the force to pull flexible pull member 220 to retract landing gear 200 or to release flexible pull member 220 in a controlled manner to extend landing gear 200. In various embodiments, motor 218 is an electromechanical motor. In various embodiments, motor 218 is instead a passive damper system around which flexible pull member 220 passes. In various embodiments, the motive force to move flexible pull member 220 may be located within the landing gear storage bay. In various embodiments, motor 218 includes a sprocket, cog, pinion, gear, rollers, or other means, to control flexible pull member 220. In various embodiments, motor 218 is rotatably mounted to the aircraft to enable motor 218 to exert a consistent force on flexible pull member 220 during the process of extending and retracting landing gear assembly 202.

Flexible pull member 220 is coupled to attachment point 216 and motor 218. Flexible pull member 220 reduces the overall storage space used by landing gear 200 by removing the bulky hydraulic member previously used to control extending and retracting of landing gear 200. Flexible pull member 220 may be a belt, cable, chain, rod, or other suitable mechanism. As flexible pull member 220 is engaged by motor 218, flexible pull member 220 advances or retracts around motor 218 to extend or retract landing gear assembly 202. In various embodiments, flexible pull member 220 advances or retracts around a passive damper system as motor 218 engages flexible pull member 220.

Figure 2B:
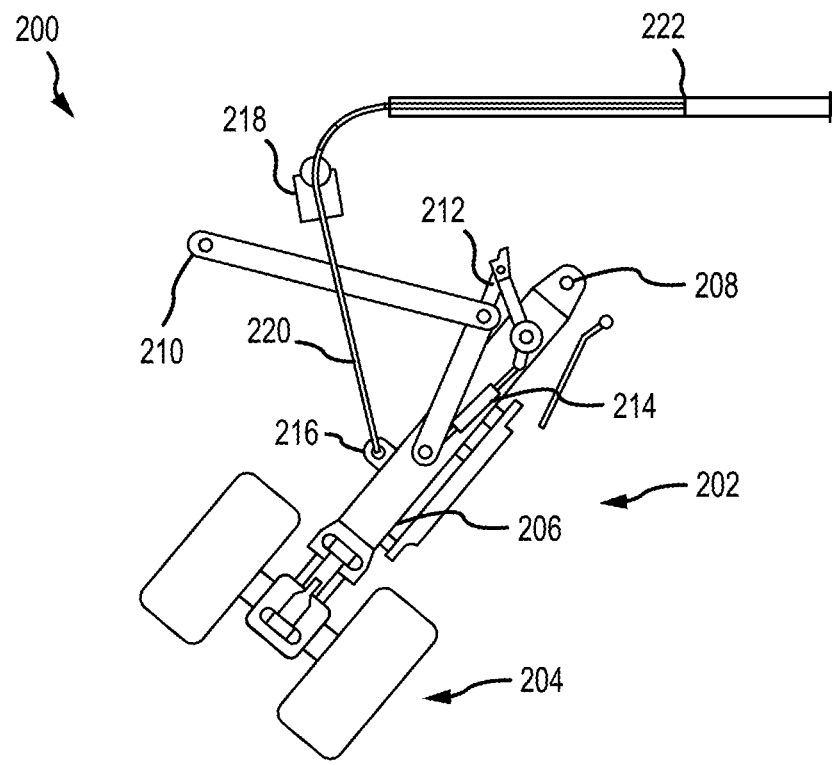
Figure 2C:
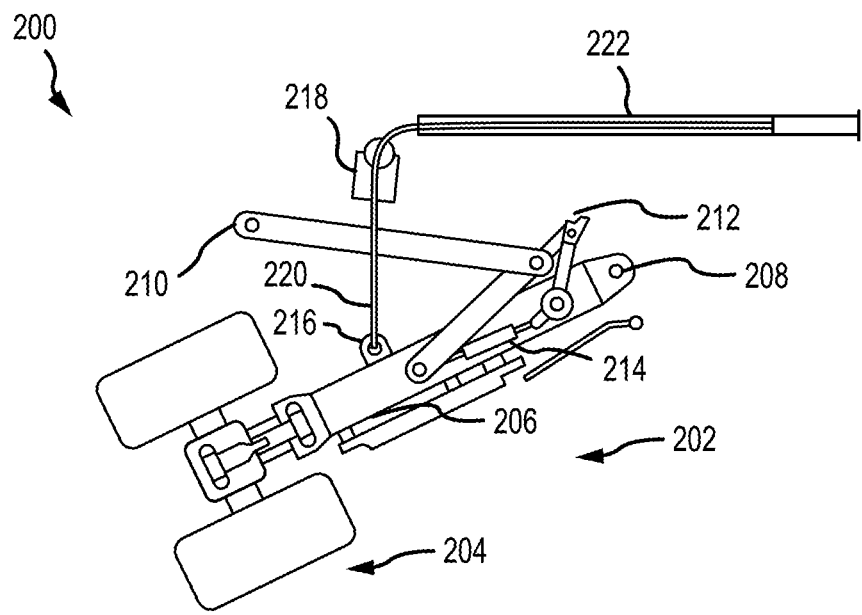
Figure 2D:
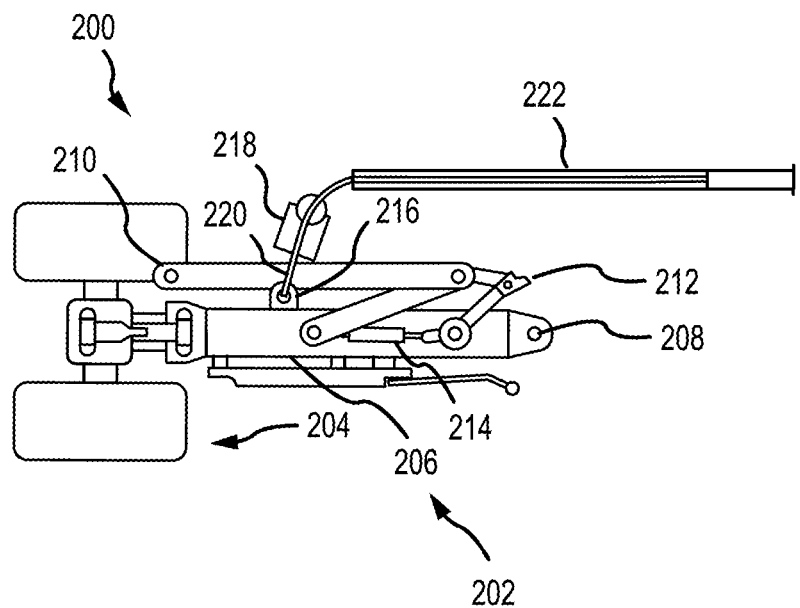

During the process of retracting landing gear assembly 202, flexible pull member exerts a force on main strut 206 at attachment point 216 thereby pulling landing gear assembly 202 up and into the landing gear storage bay. This process is illustrated by FIGS. 2A-2D. As illustrated in FIG. 2A, landing gear assembly 202 is fully extended. As motor 218 activates flexible pull member 220 is engaged and pulls on main strut 206, thereby moving landing gear assembly 202 laterally. As depicted in FIG. 2B, motor 218 is activated and retracts flexible pull member 220 thereby pulling on main strut 206 at attachment point 216. This force causes landing gear assembly 202 to move laterally (e.g., to the left as depicted). In various embodiments, motor 218 rotates during the retracting process in order to apply consistent force to flexible pull member 220. As depicted in FIG. 2C, landing gear assembly 202 is further in the retracting process. Motor 218 is rotated to provide a vertical force to flexible pull member 220 thereby improving the efficiency of the retracting process. Portions of flexible pull member 220 that have been retracted may be stored in a number of ways. For example, during storage flexible pull member 220 may be wrapped, folded, coiled, or stored in another manner during retraction. As illustrated in FIG. 2D, landing gear assembly 202 is fully retracted with motor 218 and flexible pull member 220 holding landing gear assembly 202 in place. This configuration may provide for storage of landing gear assembly 202 with minimal energy expenditure. For example, motor 218 may lock to prevent flexible pull member 220 from extending in response to movement of landing gear assembly 202.

During the extension of landing gear assembly 202, the process described above is reversed. For example, the extension process begins at FIG. 2D. Motor 218 advances flexible member 220 in a consistent and controlled manner to safely lower landing gear assembly 202. In various embodiments, dampener 214 aids in the extending process ensuring that landing gear assembly 202 extends in a controlled manner. During the extension process, motor 218 may monitor the tension in flexible pull member 220 to maintain proper tension and eliminate slack in flexible pull member 220 to provide a consistent and safe extension of landing gear assembly 202. At FIGS. 2C and 2B, the extension process is continued with landing gear assembly 202 being lowered further until landing gear assembly 202 is fully extended as depicted in FIG. 2A.

In various embodiments, a spring and/or dampener 222 may be implemented at one end of flexible pull member 220 to keep flexible pull member 220 taut through the extending and retracting processes. The spring and/or dampener 222 may aid motor 218 by managing unpredictable loads on flexible pull member 220 such as acceleration, climbing, banking, turbulence, and so forth. In various embodiments, dampener 214 may be part of a system, such as including a spring, to provide a controlled descent of landing gear assembly 202 when power is lost to motor 218.

Figure 3A:
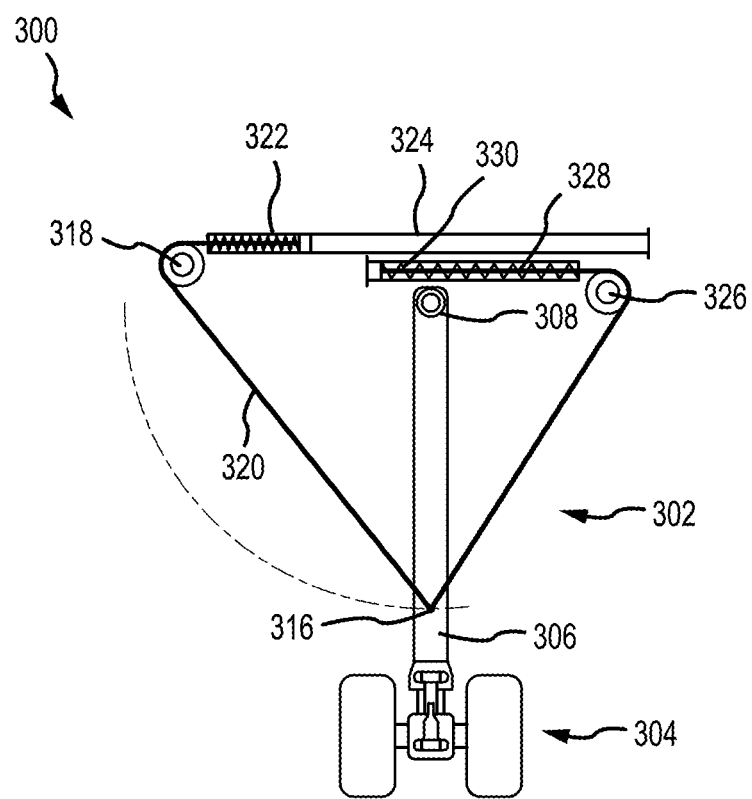
FIGS. 3A, 3B, and 3C illustrate an exemplary landing gear actuation system using a flexible transmission member, according to various embodiments.
Figure 3B:
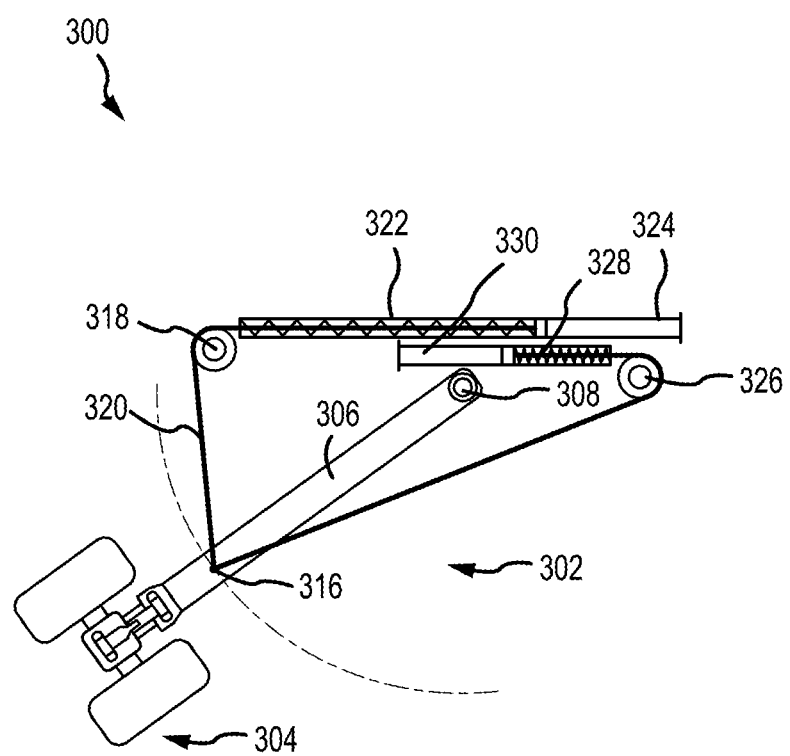
Figure 3C:
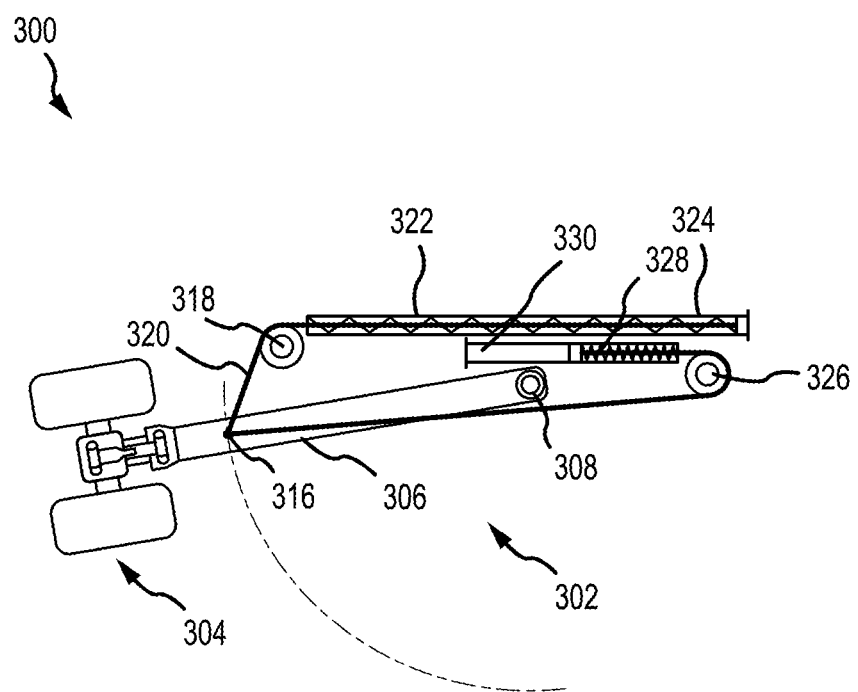

Referring now to FIGS. 3A-3C, illustrated is an exemplary landing gear 300 in multiple positions during an extending or retracting procedure, according to various embodiments of the present disclosure. Landing gear 300 may be an example of left landing gear 102, right landing gear 104, or nose landing gear 106. Landing gear 300 includes a landing gear assembly 302 and a wheel assembly 304. Landing gear assembly 302 includes a main strut 306 and a trunnion 308. As illustrated in FIGS. 3A-3C, landing gear assembly 302 rotates about trunnion 308 during extending and retracting procedures.

In various embodiments, an actuation system of landing gear 300 includes an attachment point 316, a first motor 318, a flexible pull member 320, a first spring 322, a first storage compartment 324, a second motor 326, a second spring 328, and a second storage compartment 330. Attachment point 316 may be similar to attachment point 216 described above with respect to FIGS. 2A-2D. First motor 318 and second motor 326 are similar to motor 218 described above with respect to FIGS. 2A-2D. In various embodiments, first motor 318 or second motor 326 is a passive damper with the other motor providing the motive force to move flexible pull member 320. Flexible pull member 320 is similar to flexible pull member 220 described above with respect to FIGS. 2A-2D.

In various embodiments, flexible pull member 320 has a first end attached to first storage compartment 324, wraps around and/or through first motor 318, attachment point 316, and second motor 326, and has a second end attached to second storage compartment 330. In various embodiments, flexible pull member 320 is configured as a loop that may move in a continuous manner around first motor 318, attachment point 316, and second motor 326. Flexible pull member 320 may replace conventional folding multi-bar linkages to simplify the mechanics of landing gear 300. For example, flexible pull member 320 may maintain tension throughout the length of flexible pull member 320 to ensure the stability of landing gear 300 when in the extend position and on the ground.

In various embodiments, springs 322, 328 may be a physical spring, a gas spring, and/or a sealable gas spring, just to name a few. In various embodiments, springs 322, 328 are a damper such as pneumatic damper, a nitrogen gas damper, a hydraulic damper, just to name a few. In various embodiments, springs 322, 328 are the same type of spring or damper. In various embodiments, springs 322, 328 are different types of spring or damper. The type of spring or damper selected may depend on the requirements for the specific use case. Regardless of which is chosen, the functionality is the same. Springs 322, 328 store energy when extending and retracting landing gear 300. The stored energy may aid in extending and retracting landing gear 300. Additionally, the stored energy dampens sudden movement of landing gear 300 (e.g., g-forces) during extension and retraction in order to maintain tension in the flexible pull member 320. The sudden movement may be caused by the airplane climbing or descending, turbulence, banking, accelerating, decelerating, etc.

FIG. 3A depicts landing gear 300 in an extended position with flexible pull member 320 extended. Flexible pull member 320 is connected to spring 322 within first storage compartment 324 at a first end and to spring 328 within second storage compartment 330 at a second end. As seen in FIG. 3A, spring 322 is compressed, spring 328 is extended, and flexible pull member 320 is at its longest when landing gear 300 is extended. That is, the distance between first motor 318, attachment point 316, and second motor 326 is at its longest.

FIG. 3B depicts landing gear 300 while retracting or extending. When retracting landing gear 300, first motor 318 and second motor 326 work together to retract flexible pull member 320 into first storage compartment 324 and extend flexible pull member 320 from second storage compartment 330. During this process, first spring 322 extends and second spring 328 compresses. The tension in first spring 322 and second spring 328 maintain tension in flexible pull member 320 and dampen any additional g-forces that may occur, such as during climbing, banking, and turbulence, just to name few. While retracting the landing gear 300, second motor 326 may be in idle mode with first motor 318 providing the motive force in combination with springs 322, 328.

When extending landing gear 300, first motor 318 and second motor 326 work together to extend flexible pull member 320 from first storage compartment 324 and retract flexible pull member 320 into second storage compartment 330. During this process, first spring 322 compresses and second spring 328 extends. The tension in first spring 322 and second spring 328 maintain tension in flexible pull member 320 to help control how quickly landing gear 300 extends and dampen any additional g-forces that may occur, such as during descent, banking, and turbulence, just to name a few. While extending landing gear 300, first motor 318 may be in idle mode with second motor 326 providing the motive force in combination with springs 322, 328. In various embodiments, landing gear 300 may extend with both first motor 318 and second motor 326 in idle mode and dampening the descent of landing gear 300 while extending. As illustrated, first spring 322 is partially extended within first storage compartment 324 and second spring 328 is partially compressed within second storage compartment 330.

FIG. 3C depicts landing gear 300 in a stowed position. In various embodiments, landing gear 300 may be stowed in a position that is higher or lower than depicted. When landing gear 300 is stowed, flexible pull member 320 is at its shortest. That is, the distance between first motor 318, attachment point 316, and second motor 326 is at its shortest. As seen in FIG. 3C, first spring 322 is extended within first storage compartment 324 and second spring 328 is compressed within second storage compartment 330.

Figure 4:
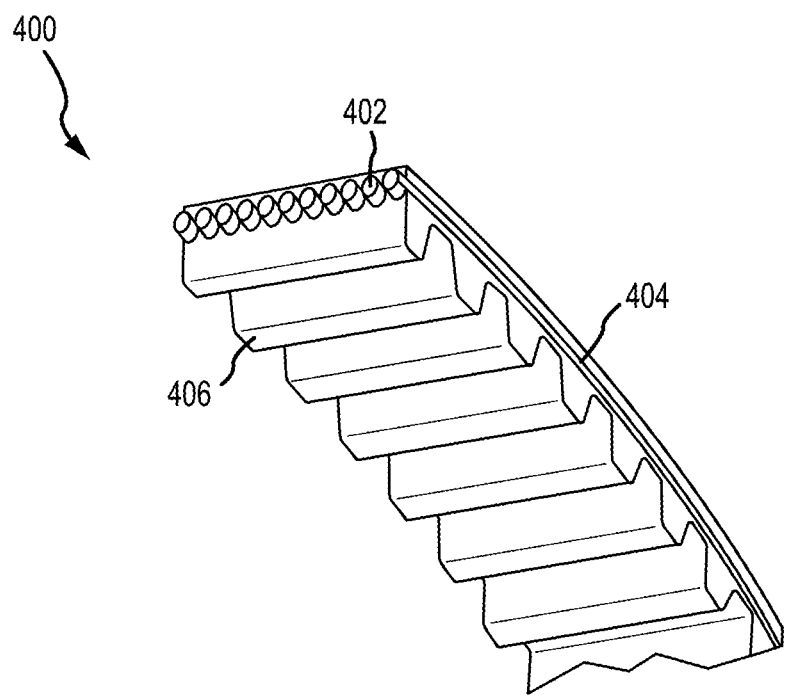
FIG. 4 illustrate an exemplary flexible transmission member, according to various embodiments.

Referring now to FIG. 4, illustrated is an exemplary flexible pull member 400 for use in a landing gear actuation system, according to various embodiments of the present disclosure. In various embodiments, flexible pull member 400 may be an example of flexible pull member 220 described above with respect to FIGS. 2A-2D. In various embodiments, flexible pull member 400 may be an example of flexible pull member 320 described above with respect to FIGS. 3A-3C. Flexible pull member 400 includes a plurality of flexible cables 402, a top layer 404, and a ridged bottom layer 406. Flexible cables 402 may be made from carbon fibers or any other suitable material that can support a tight bending radius. Flexible cables 402 provide strength and support for flexible pull member 320. There may be more or fewer flexible cables 402 than depicted. Top layer 404 provides an upper material layer to provide support and rigidity for the plurality of flexible steel cables 402. Ridged bottom layer 406 includes a plurality of ridges that are configured to engage with a drive motor such as motor 218 or motors 318, 326, for example. The top layer 404 and ridged bottom layer 406 may be manufactured of the same material.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A landing gear actuation system, comprising:
   a side stay, wherein the side stay, when extended, is configured support for movable member to stay extended;
   a wheel assembly;
   a locking link, wherein a first end of the locking link is coupled to the side stay and an intermediate portion of the locking link is coupled to the movable member and wherein the locking link is configured to provide locking support to the side stay to keep the side stay extended;
   an attachment point integral to a movable member between the side stay and the wheel assembly of the movable member;
   a flexible pull member having a first end coupled to the attachment point;
   a motor configured to engage the flexible pull member and to:
      responsive to receiving a command to retract the movable member, exert a force to pull the flexible pull member to retract the movable member; and
      responsive to receiving a command to extend the movable member, exert a force to advance the flexible pull member in a controlled manner to extend the movable member, wherein the movement of the flexible pull member moves the attachment point and the movable member; and
   a first dampener, wherein a first end of the first dampener is coupled to a second end of the locking link and a second end of the first dampener is coupled to the side stay, the first dampener configured to, when extended, provide support to the side stay in the extended position and configured to, when extending, provide controlled descent of the movable member.

2. The landing gear actuation system of claim 1, further comprising:
   a spring configured to maintain tension in the flexible pull member, wherein the flexible pull member has a second end opposing the first end, the second end coupled to the spring.

3. The landing gear actuation system of claim 1, wherein the motor is an electro-mechanical motor, the flexible pull member extending around the motor and moving in response to the motor rotating.

4. The landing gear actuation system of claim 1,
   wherein the flexible pull member further includes a first side orthogonal to the first end, the first side having a plurality of ridges,
   wherein the motor is configured to engage the plurality of ridges to move the flexible pull member.

5. The landing gear actuation system of claim 1, wherein the motor is configured to rotate as the moveable member moves.

6. The landing gear actuation system of claim 1, further comprising:
   a second dampener coupled to the flexible pull member and configured to maintain tension in the flexible pull member.

7. A landing gear for an aircraft, comprising:
   a landing gear assembly having a main strut;
   a wheel assembly coupled to the main strut of the landing gear assembly;
   an actuation system configured to extend and retract the landing gear, the actuation system including:
      an attachment point integral to the main strut between a side stay and a wheel assembly of the main strut;
      a motor configured to engage the flexible pull member and to:
         responsive to receiving a command to retract the main strut, exert a force to pull the flexible pull member to retract the main strut; and
         responsive to receiving a command to extend the main strut, exert a force to advance the flexible pull member in a controlled manner to extend the main strut; and
      the flexible pull member having a first end coupled to the attachment point, the flexible pull member passing around the motor in response to the motor rotating;
   a side stay, wherein the side stay, when extended, is configured support for main strut to stay extended;
   a locking link, wherein a first end of the locking link is coupled to the side stay and an intermediate portion of the locking link is coupled to the main strut and wherein the locking link is configured to provide locking support to the side stay to keep side stay extended; and
   a dampener, wherein a first end of the dampener is coupled to a second end of the locking link and a second end of the dampener is coupled to the side stay, the dampener configured to, when extended, provide support to the side stay in the extended position and configured to, when extending, provide controlled descent of the movable member.

* * * * *